United States Patent
Zhang et al.

(10) Patent No.: US 9,362,058 B2
(45) Date of Patent: Jun. 7, 2016

(54) HIGH SAFETY VEHICULAR CAPACITOR

(75) Inventors: Zikui Zhang, Shanghai (CN); Feng Xu, Shanghai (CN); Jinhua Jiang, Shanghai (CN)

(73) Assignees: SHANGHAI HAOYE ELECTRIC CO., LTD, Shanghai (CN); SHANGHAI HAOYE CAPACITORS CO., LTD., Shanghai (CN)

( * ) Notice: Subject to any disclaimer, the term of this patent is extended or adjusted under 35 U.S.C. 154(b) by 280 days.

(21) Appl. No.: 14/234,634

(22) PCT Filed: Jun. 25, 2012

(86) PCT No.: PCT/CN2012/000872
§ 371 (c)(1),
(2), (4) Date: Jan. 24, 2014

(87) PCT Pub. No.: WO2013/016945
PCT Pub. Date: Feb. 7, 2013

(65) Prior Publication Data
US 2014/0160629 A1   Jun. 12, 2014

(30) Foreign Application Priority Data
Jul. 29, 2011 (CN) .......................... 2011 1 0214032

(51) Int. Cl.
H01G 4/228 (2006.01)
H01G 9/048 (2006.01)
H01G 2/04 (2006.01)
H01G 9/008 (2006.01)
H01G 2/10 (2006.01)

(52) U.S. Cl.
CPC ................ *H01G 9/048* (2013.01); *H01G 2/04* (2013.01); *H01G 9/008* (2013.01); *H01G 2/106* (2013.01)

(58) Field of Classification Search
USPC ................. 361/301.3, 306.1, 308.1, 328–330
See application file for complete search history.

(56) References Cited

U.S. PATENT DOCUMENTS

| | | | |
|---|---|---|---|
| 7,092,238 B2 * | 8/2006 | Saito | H01G 2/10 361/301.5 |
| 2003/0031038 A1 * | 2/2003 | Shirakawa | H02M 7/003 363/144 |
| 2010/0155158 A1 * | 6/2010 | Azuma | B60K 6/28 180/65.8 |

* cited by examiner

*Primary Examiner* — Eric Thomas
(74) *Attorney, Agent, or Firm* — Kening Li; Miller Canfield

(57) ABSTRACT

The invention relates to a safety vehicle capacitor. It includes a box-shaped capacitor shell, lead-out electrode sheet, capacitor core accommodated inside capacitor shell and epoxy resin used to encapsulate the capacitor core. Said lead-out electrode sheet comprises of an inner connection end, an intermediate connection portion and outer connection, where the intermediate connection portion is in a shape of 'n' or 'v', one end of said intermediate connection portion being connecting to inner end of outer connection end horizontally, while the other end of intermediate connection portion being connected to up end of inner connection end with an angle; the inner wall of said capacitor shell is provided with inner mounting slot for the lead-out electrode sheet, and said inner connection end of said lead-out electrode sheet is inserted in to said inner mounting slot for fixing; the capacitor shell containing the inner mounting slot has a corresponding outer wall provided with a fixing pillar for the lead-out electrode sheet, and said outer connection end of the lead-out electrode sheet is fixed to the fixing pillar through a fixing element; said intermediate connection portion of the lead-out electrode sheet locates above the epoxy resin surface.

7 Claims, 3 Drawing Sheets

HIGH SAFETY VEHICULAR CAPACITOR

FIELD OF THE INVENTION

The invention relates to a capacitor, particularly a high safety vehicular capacitor.

BACKGROUND

Most of vehicular capacitors adopted nowadays are regular epoxy encapsulated capacitors, while there are few vehicular capacitors available particularly designed for vehicular conditions. Though the description of a Chinese utility model (Publishing Number: CN201622936U) patent discloses a DC support filter capacitor for an automobile, where a capacitor core is set inside the capacitor shell, the two ends of the said capacitor core are welded each with a copper piece as a lead-out wire, and the two lead-out wires are riveted to the frame, thus forming the two terminals of the capacitor. The epoxy resin is stuffed between the capacitor core and the capacitor shell. The capacitor fits the situation for hybrid vehicles with a performance of a good filter effect and a small temperature raise for a long working period. However, this kind of capacitors encounters the following problems during the production and application:

1. Electrode slides are not easy to fix on the capacitor shell during the mounting, particularly that the encapsulation of the epoxy resin makes the electrode slides easy to move, which may affect the quality of the product.

2. The box-shaped capacitor is not easy to fix, since there exit no auxiliary structure set on the product for the mounting of the capacitor.

3. When the capacitor is connected and being used, it is easy for the electrode slides to tear apart from the epoxy resin due to the quiver and vibration of the vehicles, thus affecting the performance of the product and even the safety of the vehicles.

Besides, the fixing of the capacitor core inside the capacitor shell is still a problem remained unsolved.

SUMMARY OF THE INVENTION

It is an object to provide a high safety vehicular capacitor, mainly to solve the problems of above mentioned present techniques, especially the problem of the electrode sheet being torn apart from the epoxy resin. The invention can enhance the anti-knock performance of the vehicular capacitor and easy to be mounted, thus ensuring the safe use of the vehicular capacitor.

To realize the object, the invention is implemented as follows:

A high safety vehicle capacitor, includes a box-shaped capacitor shell 1, lead-out electrode sheet, capacitor core accommodated inside capacitor shell and epoxy resin used to encapsulate the capacitor core, characterized in that, said lead-out electrode sheet comprises of an inner connection end, an intermediate connection portion and outer connection, where the intermediate connection portion is in a shape of 'n' or 'v', one end of said intermediate connection portion being connecting to inner end of outer connection end horizontally, while the other end of intermediate connection portion being connected to up end of inner connection end with an angle; the inner wall of said capacitor shell is provided with inner mounting slot for the lead-out electrode sheet, and said inner connection end of said lead-out electrode sheet is inserted in to said inner mounting slot for fixing; the capacitor shell containing the inner mounting slot has a corresponding outer wall provided with a fixing pillar for the lead-out electrode sheet, and said outer connection end of the lead-out electrode sheet is fixed to the fixing pillar through a fixing element; said intermediate connection portion of the lead-out electrode sheet locates above the epoxy resin surface.

Said high safety vehicle capacitor is characterized in that, said intermediate connection portion is connected to up end of inner connection end vertically.

Said high safety vehicle capacitor is characterized in that, said fixing pillar for the lead-out electrode sheet is provided with a fixing slot on its upper end for the fixing screw nut and a fixing screw nut is set inside the fixing slot; Said outer connection end of the lead-out electrode sheet is extended above the fixing screw nut and is provided with a corresponding fixing hole for the screw nut inside hole; A fixing element connects the outer connection end of the lead-out electrode sheet and the fixing pillar through the fixing hole and fixing screw nut.

Said high safety vehicle capacitor is characterized in that, the bottom of corresponding one or two outer side walls of said capacitor shell is extended with a mounting ear, and said mounting ear has a mounting hole on it.

Said high safety vehicle capacitor is characterized in that, the mounting hole of said mounting ear is inserted with a medal annular tube.

Said high safety vehicle capacitor is characterized in that, the bottom of said capacitor shell is provided with a fixing pillar.

Said high safety vehicle capacitor is characterized in that, a firmness bar 16 is set inside the said capacitor shell 1.

With the structure mentioned above, the utility model has following advantages:

1. when the product of the invention is in use, the vibration strength caused by vehicle vibrating is not easy to be conveyed to the combination portion of the lead-out electrode sheet and epoxy resin, which ensures the safe use of the capacitor.

2. when the product of the invention is being mounted, since the inner wall of said capacitor shell is provided with inner mounting slot for the lead-out electrode sheet, said inner connection end of said lead-out electrode sheet is inserted in to said inner mounting slot for fixing. Said fixing pillar for the lead-out electrode sheet is provided with a fixing slot on its upper end for the fixing screw nut and a fixing screw nut is set inside the fixing slot. Said outer connection end of the lead-out electrode sheet is extended above the fixing screw nut and is provided with a corresponding fixing hole for the screw nut inside hole. A fixing element connects the outer connection end of the lead-out electrode sheet and the fixing pillar through the fixing hole and fixing screw nut. Therefore, the lead-out electrode sheet of the invention is easy to be fixed and located, thus avoiding the movement of the electrode sheet during the encapsulation of the epoxy resin, which may affect the quality of the product.

3. when the product of the invention is being mounted, since the bottom of corresponding two outer side walls of said capacitor shell 1 is extended with a mounting ear 12, and said mounting ear has a mounting hole 15 on it. The mounting hole 15 of said mounting ear 12 is inserted with a medal annular tube 14. The bottom of said capacitor shell 1 is provided with a fixing pillar 13. The embodiment also solves the problem of the mounting and location of the capacitor.

Figure 1:
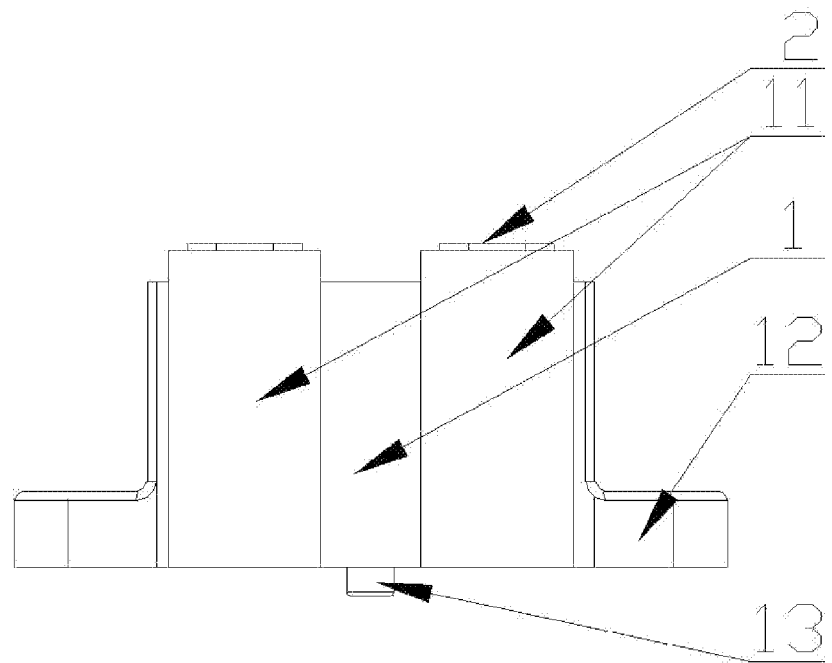
FIG. 1 is a front view of $1^{st}$ embodiment.
Figure 2:
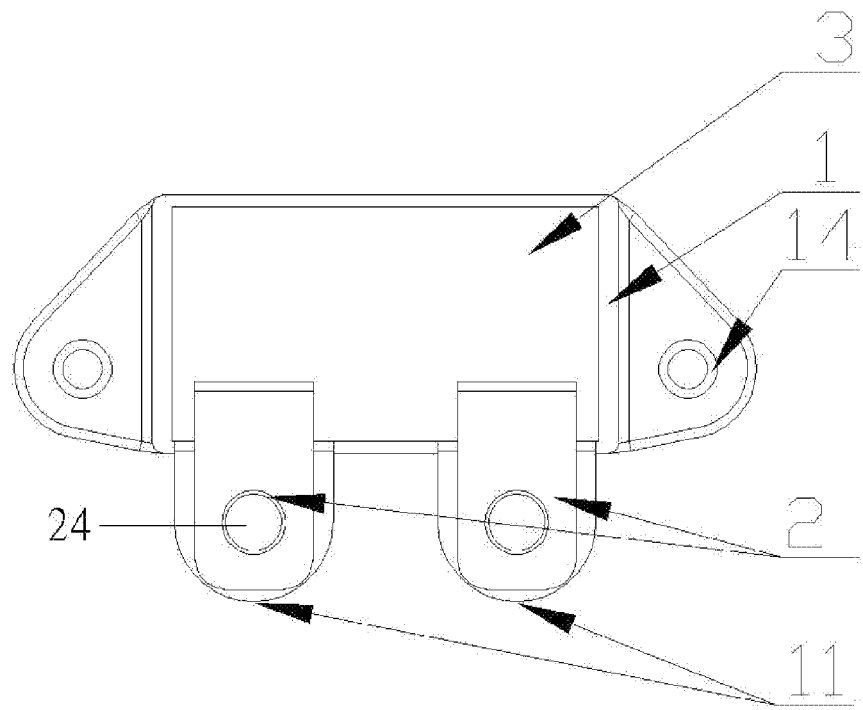
FIG. 2 is a vertical view of $1^{st}$ embodiment.
Figure 3:
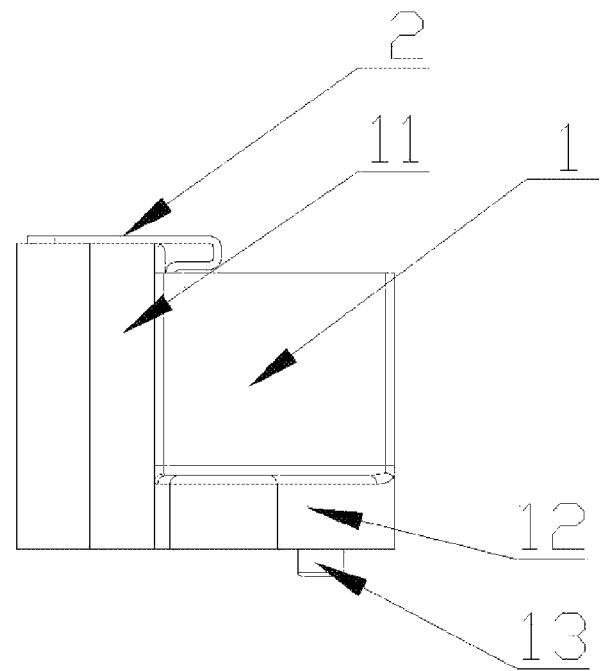
FIG. 3 is a right view of 1$^{st}$ embodiment.
Figure 4:
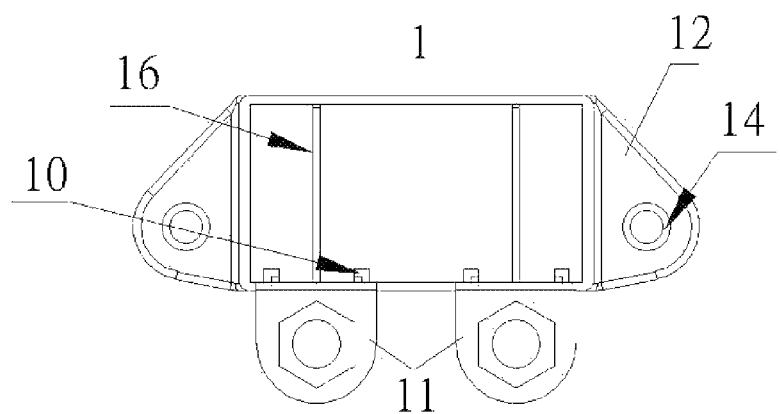
FIG. 4 is a schematic illustration of the capacitor shell in 1$^{st}$ embodiment.
Figure 5:
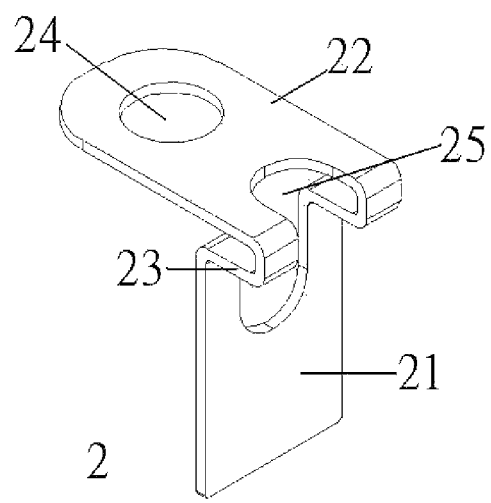
FIG. 5 is a schematic illustration of the electrode sheet in 1$^{st}$ embodiment.

In the figures, 1-capacitor shell; 10-inner mounting slot for the lead-out electrode sheet; 11-fixing pillar for the lead-out electrode sheet; 12-mounting ear; 13-location pillar; 14-medal annular tube; 15-mounting hole; 16-firmness bar; 2-lead-out electrode sheet; 21-inner connection end; 22-outer connection end; 23-intermediate connection portion; 24-fixing hole; 25-stress release hole; 3-epoxy resin.

DESCRIPTION OF THE PREFERRED EMBODIMENT

Please refer to FIG. 1~5, they are schematic illustrations of a high safety vehicular capacitor disclosed by the invention. As illustrated, it includes a box-shaped capacitor shell 1, lead-out electrode sheet 2, capacitor core accommodated inside capacitor shell 1 and epoxy resin 3 used to encapsulate the capacitor core. Said lead-out electrode sheet 2 comprises of an inner connection end 21, an intermediate connection portion 23 and outer connection 22, where the intermediate connection portion 23 is in a shape of 'n' or 'v', one end of which being connecting to inner end of outer connection end 22 horizontally, while the other end of which being connected to up end of inner connection end 21 with an angle (preferably said intermediate connection portion 23 is connected to up end of inner connection end 21 vertically). The inner wall of said capacitor shell 1 is provided with inner mounting slot 10 for the lead-out electrode sheet, and said inner connection end 21 of said lead-out electrode sheet 2 is inserted in to said inner mounting slot 10 for fixing. The capacitor shell 1 containing the inner mounting slot 10 has a corresponding outer wall provided with a fixing pillar 11 for the lead-out electrode sheet, and said outer connection end 22 of the lead-out electrode sheet 2 is fixed to the fixing pillar 11 through a fixing element. Said intermediate connection portion 23 of the lead-out electrode sheet 2 locates above the epoxy resin surface.

In the embodiment, said fixing pillar 11 for the lead-out electrode sheet is provided with a fixing slot on its upper end for the fixing screw nut and a fixing screw nut is set inside the fixing slot. Said outer connection end 22 of the lead-out electrode sheet 2 is extended above the fixing screw nut and is provided with a corresponding fixing hole 24 for the screw nut inside hole. A fixing element connects the outer connection end 22 of the lead-out electrode sheet 2 and the fixing pillar 11 through the fixing hole 24 and fixing screw nut.

In the embodiment, the bottom of corresponding tow outer side walls of said capacitor shell 1 is extended with a pair of mounting ears 12, each of which has a mounting hole 15. The mounting hole 15 of said mounting ear 12 is inserted with a medal annular tube 14. The bottom of said capacitor shell 1 is provided with a fixing pillar 13.

In the embodiment, a firmness bar 16 is set inside the said capacitor shell 1 to enhance the strength of the shell.

The embodiment has the following advantages over the present vehicular capacitor when in use:

1. Due to the special structure of the lead-out electrode sheet 2, when the capacitor is in use, the vibration strength caused by the vehicle is conveyed to the outer connection end 22 of the lead-out electrode sheet 2, however the vibration strength will be absorbed or weakened when going through the intermediate portion 23 in shape of 'v' or 'n', which the vibration strength is not quite possible to be conveyed to the connection portion of the lead-out electrode sheet 2 and the epoxy resin, thus ensuring the safe use of the capacitor. Said intermediate portion 23 of the lead-out electrode sheet 2 also has a stress release hole 25, which can be extended to the inner connection end 21 and outer connection end 22 to help to release the vibration strength.

2. Since the inner wall of said capacitor shell 1 is provided with inner mounting slot 10 for the lead-out electrode sheet, said inner connection end 21 of said lead-out electrode sheet 2 is inserted in to said inner mounting slot 10 for fixing. Said fixing pillar 11 for the lead-out electrode sheet is provided with a fixing slot on its upper end for the fixing screw nut and a fixing screw nut is set inside the fixing slot. Said outer connection end 22 of the lead-out electrode sheet 2 is extended above the fixing screw nut and is provided with a corresponding fixing hole 24 for the screw nut inside hole. A fixing element connects the outer connection end 22 of the lead-out electrode sheet 2 and the fixing pillar 11 through the fixing hole 24 and fixing screw nut. Therefore, the lead-out electrode sheet 2 of the invention is easy to be fixed and located, thus avoiding the movement of the electrode sheet during the encapsulation of the epoxy resin, which may affect the quality of the product.

3. Since the bottom of corresponding two outer side walls of said capacitor shell 1 is extended with a mounting ear 12, and said mounting ear has a mounting hole 15 on it. The mounting hole 15 of said mounting ear 12 is inserted with a medal annular tube 14. The bottom of said capacitor shell 1 is provided with a fixing pillar 13. The embodiment also solves the problem of the mounting and location of the capacitor.

Figure 6:
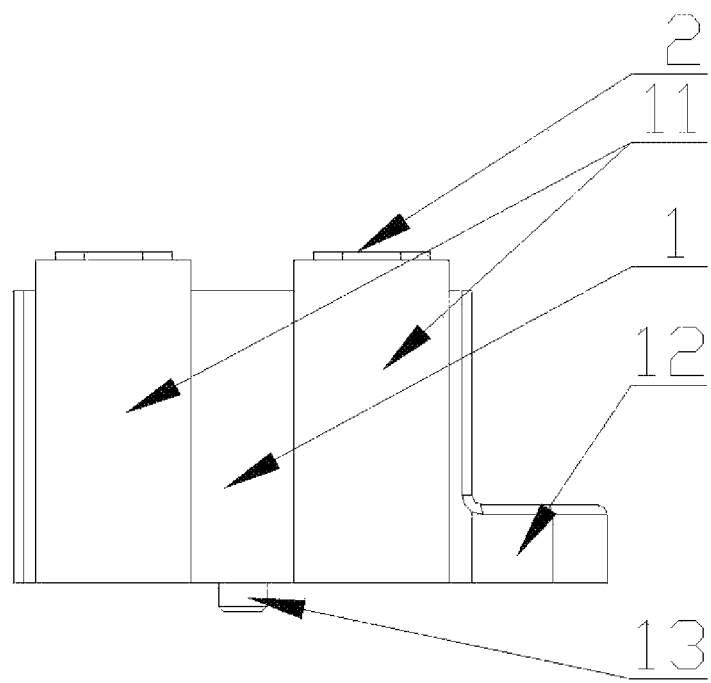
FIG. 6 is a front view of 2$^{nd}$ embodiment.

Please refer to FIG. 6, it is a schematic illustration of the 2$^{nd}$ embodiment. The difference between the 1$^{st}$ and 2$^{nd}$ embodiment is that, the bottom of one outer side wall of said capacitor shell 1 is extended with a mounting ear 12, which has a mounting hole 15 on it. The rest structure and technical benefits are similar to 1$^{st}$ embodiment, which will not be repeated in the following.

What is claimed is:

1. A high safety vehicle capacitor, comprising:
   a box-shaped capacitor shell (1);
   a lead-out electrode sheet (2);
   a capacitor core accommodated inside the box-shaped capacitor shell (1); and
   an epoxy resin (3) that encapsulates the capacitor core; wherein,
   said lead-out electrode sheet (2) comprises an inner connection end (21), an intermediate connection portion (23) and an outer connection end (22), wherein the intermediate connection portion (23) is in a shape of 'n' or 'v', one end of said intermediate connection portion (23) is connected to an inner end of the outer connection end (22) horizontally, while the other end of the intermediate connection portion (23) is connected to an end of the inner connection end (21) with an angle;
   the inner wall of said capacitor shell (1) is provided with an inner mounting slot (10) for the lead-out electrode sheet (2), and said inner connection end (21) of said lead-out electrode sheet (2) is inserted in the inner mounting slot (10) for fixing;
   the capacitor shell (1) containing the inner mounting slot (10) has a corresponding outer wall provided with a fixing pillar (11) for the lead-out electrode sheet (2), and said outer connection end (22) of the lead-out electrode sheet (2) is fixed to the fixing pillar (11) through a fixing element; and said intermediate connection portion (23) of the lead-out electrode sheet (2) is located above the epoxy resin surface.

2. The high safety vehicle capacitor according to claim 1, wherein said intermediate connection portion (23) is vertically connected to the end of the inner connection end (21).

3. The high safety vehicle capacitor according to claim 1, wherein said fixing pillar (11) for the lead-out electrode sheet (2) is provided with a fixing slot on its upper end for a fixing screw nut; and the fixing screw nut is set inside the fixing slot; said outer connection end (22) of the lead-out electrode sheet (2) is extended above the fixing screw nut and is provided with a corresponding fixing hole (24) for the screw nut inside hole; and the fixing element connects the outer connection end (22) of the lead-out electrode sheet (2) and the fixing pillar (11) through the fixing hole (24) and fixing screw nut.

4. The high safety vehicle capacitor according to claim 1 or claim 2, wherein the bottom of corresponding one or two outer side walls of said capacitor shell (1) is extended with a mounting ear (12), and said mounting ear has a mounting hole (15).

5. The high safety vehicle capacitor according to claim 4, wherein the mounting hole (15) of said mounting ear (12) is inserted with a metal annular tube (14).

6. The high safety vehicle capacitor according to claim 4, wherein the bottom of said capacitor shell (1) is provided with a fixing pillar (13).

7. The high safety vehicle capacitor according to claim 4, wherein a firmness bar (16) is set inside said capacitor shell (11).

* * * * *